United States Patent [19]
Schrag et al.

[11] Patent Number: 5,226,356
[45] Date of Patent: Jul. 13, 1993

[54] RECIPROCATING PLUNGER CROP BALER HAVING MONITORING SYSTEM FOR CHECKING UNIFORMITY OF LOADED CHARGES

[75] Inventors: Thomas G. Schrag, Hesston, Kans.; Victor D. Goeckner, Virden, Ill.; Charles F. Hood; Scott A. Morton, both of Ranchester, Wyo.

[73] Assignee: Hay & Forage Industries, Hesston, Kans.

[21] Appl. No.: 901,513

[22] Filed: Aug. 28, 1986

Related U.S. Application Data

[63] Continuation-in-part of Ser. No. 859,235, May 5, 1986, which is a continuation of Ser. No. 537,732, Sep. 30, 1983, abandoned.

[51] Int. Cl.$^5$ ............................................. B30B 15/26
[52] U.S. Cl. ........................................ 100/41; 364/550
[58] Field of Search ................. 56/341; 100/41, 43, 100/191, 35, 192, 189, 341; 364/550

[56] References Cited

U.S. PATENT DOCUMENTS

| | | | |
|---|---|---|---|
| 4,037,528 | 7/1977 | White | 100/191 |
| 4,118,918 | 10/1978 | White | 56/341 |
| 4,125,071 | 11/1978 | Young | 100/191 |
| 4,132,163 | 1/1979 | White | 100/42 |
| 4,168,659 | 9/1979 | Yatcilla et al. | 100/43 |
| 4,184,312 | 1/1980 | Oosterling et al. | 56/341 |
| 4,275,550 | 6/1981 | Swenson et al. | 56/341 |
| 4,280,403 | 7/1981 | Alderson | 100/43 |
| 4,489,648 | 12/1984 | Naaktgeboren | 100/191 |
| 4,514,968 | 5/1985 | Underhill | 56/341 |
| 4,525,991 | 7/1985 | Naakgeboren | 56/341 |
| 4,624,180 | 11/1986 | Strosser | 100/41 |

Primary Examiner—Andrew M. Falik
Attorney, Agent, or Firm—Hovey, Williams, Timmons & Collins

[57] ABSTRACT

A hay baler for producing large rectangular bales picks up crop material directly underneath the fore-and-aft bale chamber of the machine as the baler advances across the field and stuffs charges of the picked up hay into the overhead chamber for compaction by a fore-and-aft reciprocating plunger. Sensors associated with the two laterally spaced driving arms of the plunger detect the extent of uneven crop loading into the baling chamber through measuring any differential in compressive loading on the arms and cause a visual display in the cab of the towing tractor which indicates the direction and magnitude of steering correction which is required to reestablish even loading of the baler. A microcomputer receives the outputs from the driving arms, processes the same and appropriately activates the display monitor in the cab.

11 Claims, 8 Drawing Sheets

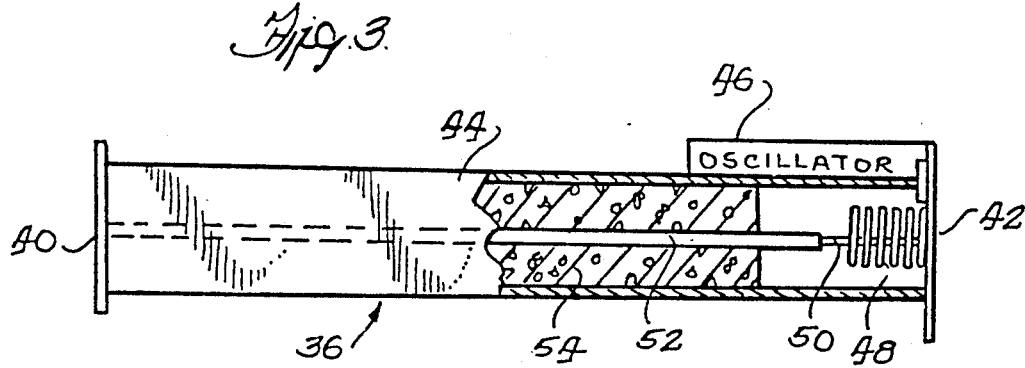
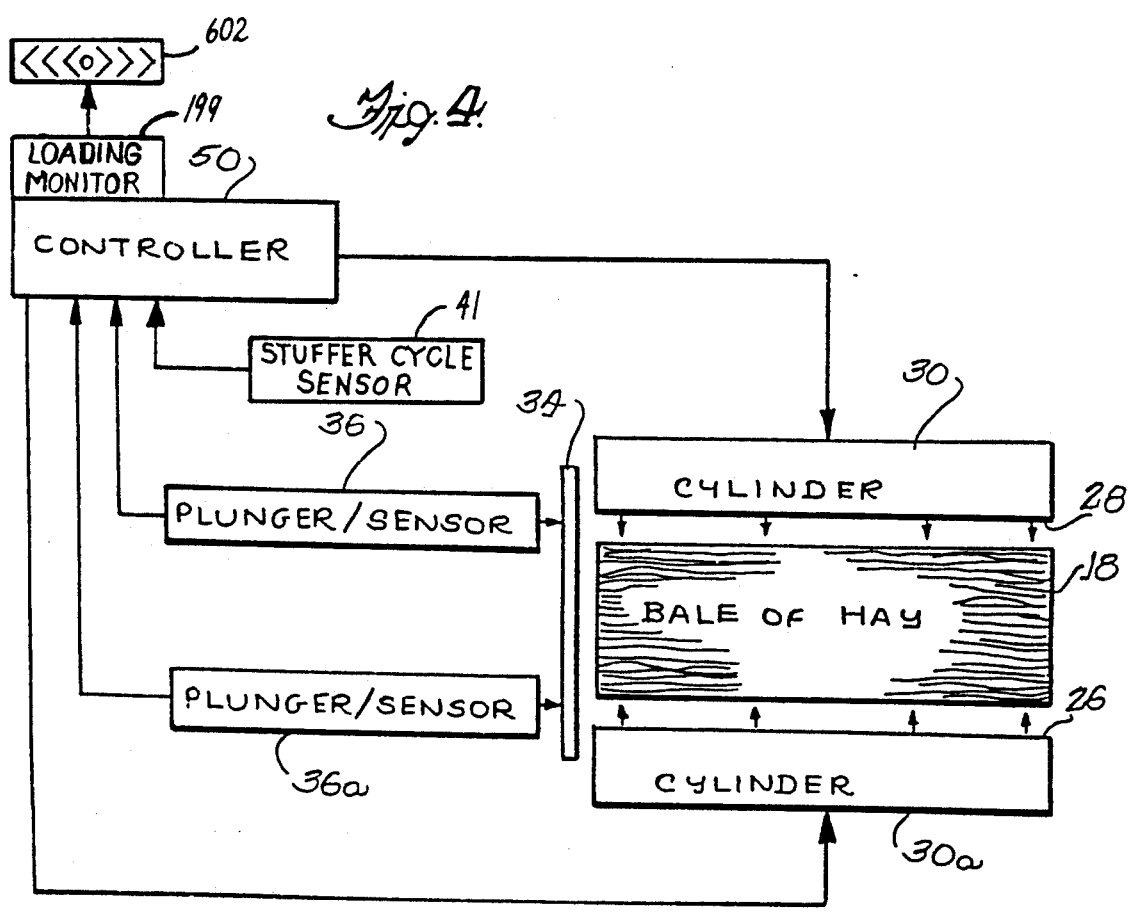

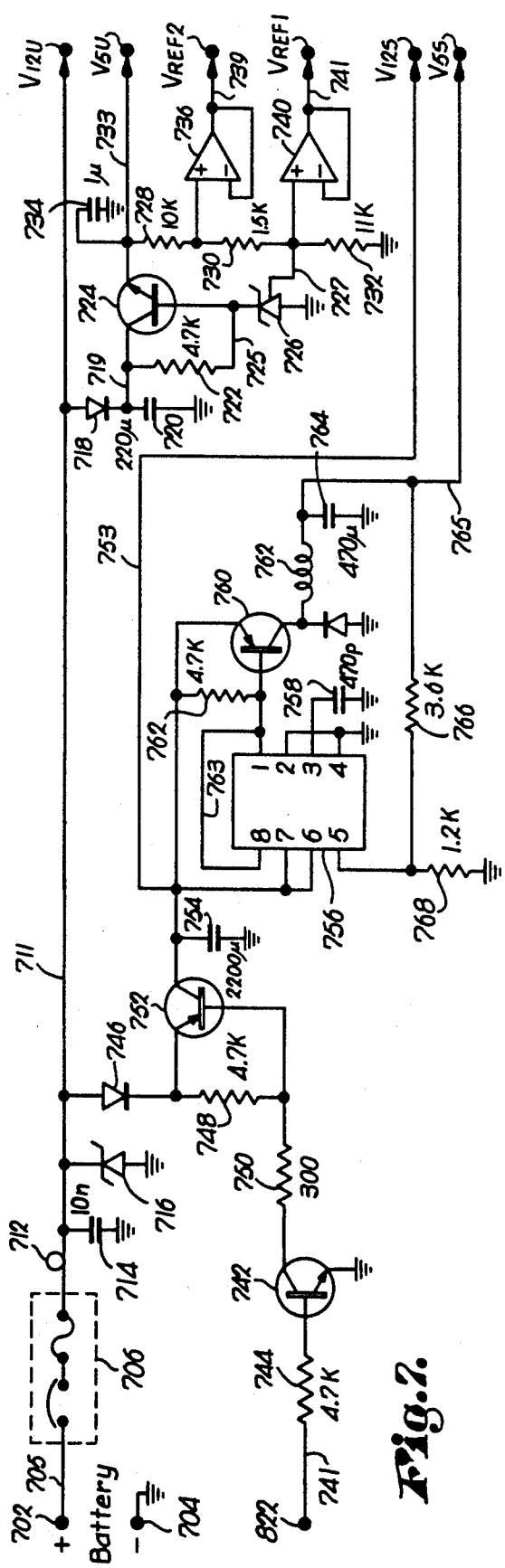
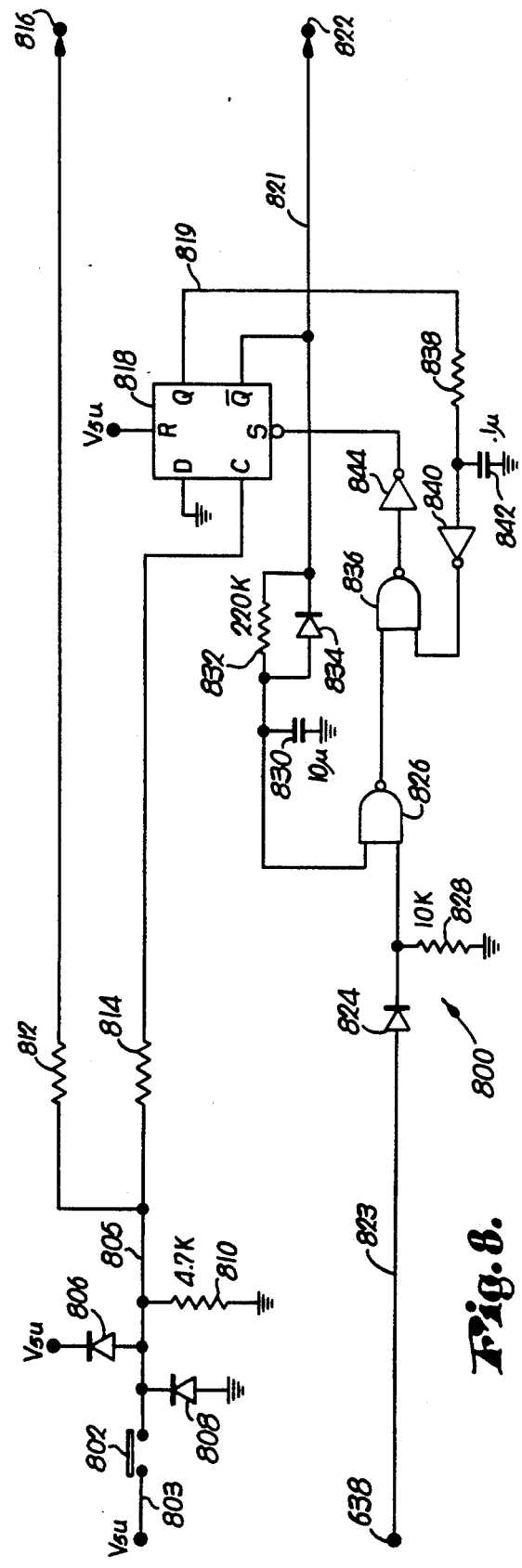
Fig. 7.
Fig. 8.

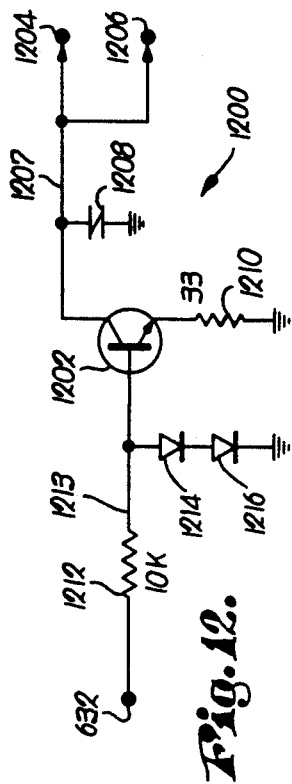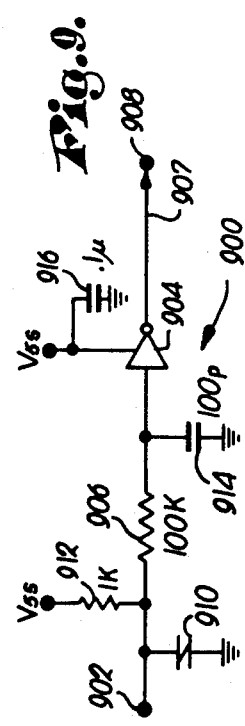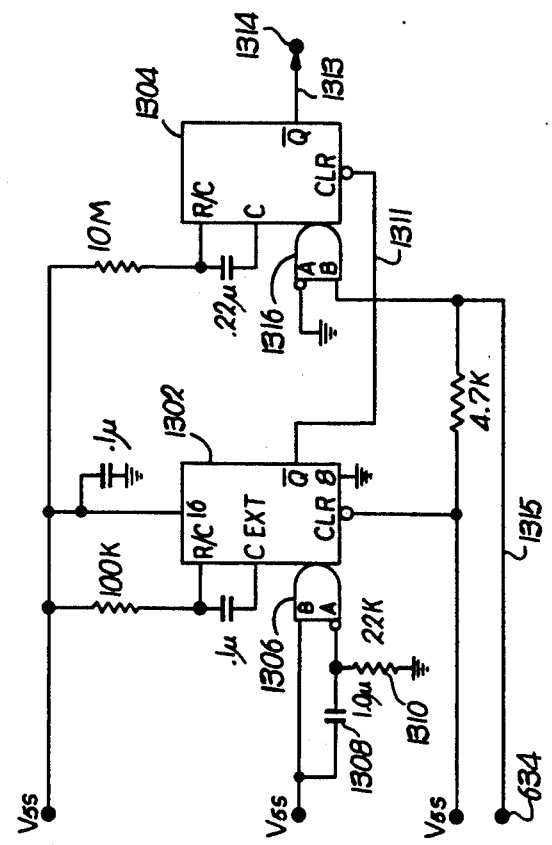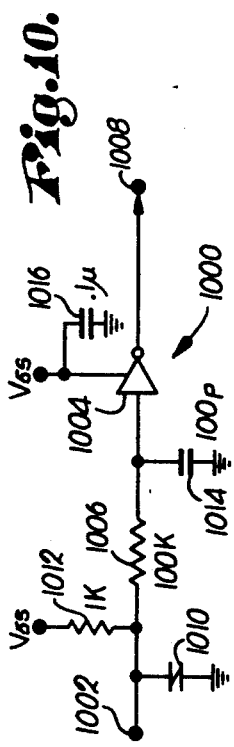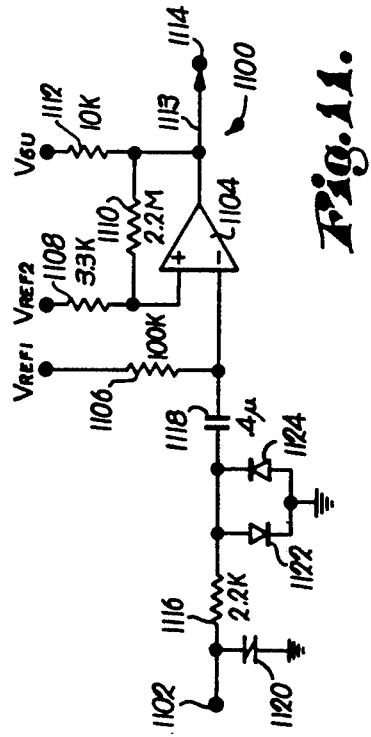

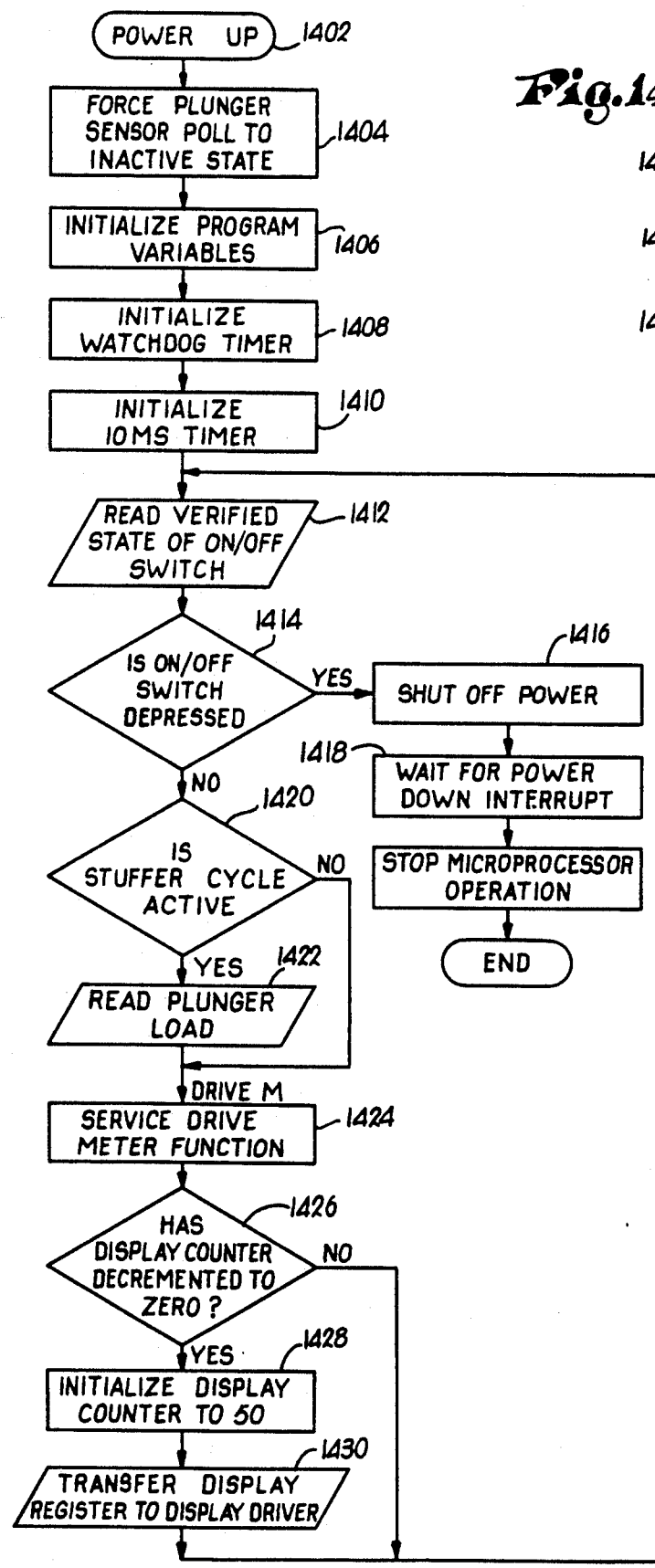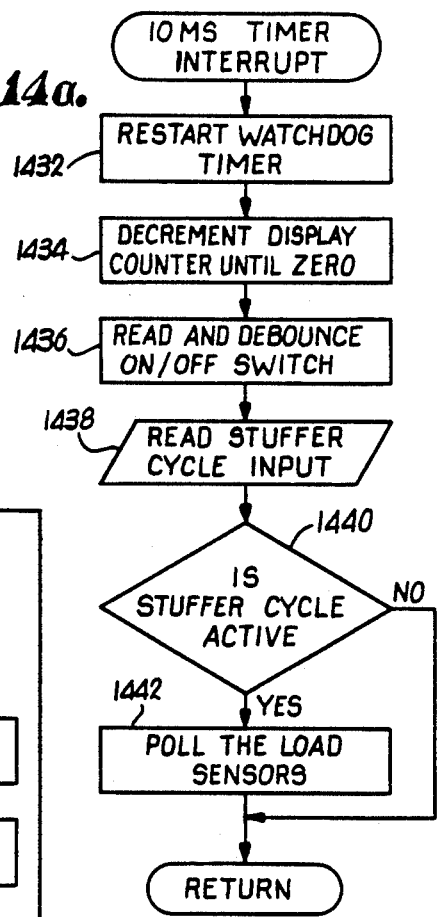
Fig.14a.
Fig.14.

RECIPROCATING PLUNGER CROP BALER HAVING MONITORING SYSTEM FOR CHECKING UNIFORMITY OF LOADED CHARGES

RELATED APPLICATIONS

This application is a continuation-in-part of copending application Ser. No. 06/859,235, filed May 5, 1986, and titled BALER LOAD SENSOR, pending which itself is a continuation of prior copending application, Ser. No. 06/537,732, filed Sep. 30, 1983, and titled BALER LOAD SENSOR abandoned.

As part of the disclosure not printed herewith, a computer program source code listing is available as "Microfiche Appendix" having a total of 36 frames contained in a total of one microfiche.

TECHNICAL FIELD

This invention relates to the field of "rectangular" hay balers and, more particularly, to a monitoring system for checking the extent to which each charge of crop materials introduced into the baling chamber of the machine for compaction is of essentially uniform volume across its entire width from side-to-side of the baler.

BACKGROUND

The present invention is particularly well suited for use in connection with large rectangular balers of the type illustrated in U.S. Pat. No. 4,106,267, which are capable of producing bales weighing one ton or more. As big balers of that type are driven along a crop windrow, towed behind a forwardly disposed tractor, the materials are picked up directly beneath the baler and are fed up into the overhead bale chamber in successive charges for subsequent compaction by a fore-and-aft reciprocating plunger in the chamber. Prior to the baling operation, the hay will normally have been gathered into long windrows, sometimes in side-by-side, so-called "double windrows", so that the baler is simply towed along the windrows straddling the same with its ground wheels on opposite outboard sides of the windrows. With the baler aligned with the windrows in this way, the operator can be fairly assured that all of the windrowed material is being picked up and fed into the baler.

However, it is not possible to prepare the windrows in such a manner that they are always of perfectly uniform volume across their widths. Thus, even though the operator may be driving straight down the windrow, it is possible that more material may be going into one side of the baling chamber than the other. And it is also not possible for the operator to at all times maintain the baler perfectly positioned on the windrow. Consequently, one side of the finished bale may contain a greater volume of materials than the other, which can have an adverse effect on the shape of the bale and total payload. In extreme conditions where the bale is seriously misshapen, it may even be difficult for the binding twines to remain in place around the bale, and subsequent hauling, stacking, and other handling may be substantially impaired. Moreover, there is no way for the operator to realize that the uneven loading problem exists until the deficient bale has been completely formed and discharged from the machine, at which point it is too late to correct the problem with respect to that particular bale. Furthermore, uneven loading in the baling chamber can result in high stress on critical parts of the drive train for the plunger.

SUMMARY OF THE PRESENT INVENTION

Accordingly, an important object of the present invention is to provide the operator with a means of identifying when uneven loading of the machine is taking place, and of doing so essentially contemporaneously with the occurrence of such uneven loading, so that the operator may take immediate and appropriate corrective steering measures before the problem becomes serious enough to adversely affect bale quality. In this respect, the present invention contemplates a monitoring system which checks the compressive loading on the plunger at a pair of laterally spaced locations across the width of the baling chamber during each compressive stroke of the plunger to determine whether or not such two loadings are equal to one another, which condition if present would indicate a uniform loading of materials into the chamber. In the event the loadings differ from one another by a predetermined significant amount, such condition indicates an uneven loading of materials into the chamber and is displayed to the operator accordingly, showing him through appropriate visual displays in which direction he should correctively steer the baler and an indication of the amount of correction needed. If the baler is properly positioned, a single center display is activated to indicate such condition, the center display therefore providing a "bulls eye" target toward which the operator may steer.

Preferably, the compressive loading in two connecting arms which drive the plunger of the baler is detected during each compression stroke when a new charge of crop material is present and used as input information for the monitoring system. Transducers associated with the two connecting rods produce outputs commensurate with the extent of compressive loading experienced by their particular rods, which outputs are processed by an electrical circuit including a controller that powers a display console at the operator's seat in the tractor to provide the operator with an ongoing display of the loading condition. Left and right arrows in the form of chevron indicia on the console indicate both the direction of steering action needed to correct the loading imbalance and broadly indicate the extent of such correction required.

BRIEF DESCRIPTION OF THE DRAWINGS

FIG. 3 is a side elevation, partially broken away illustrating a plunger connecting arm of the baler of FIGS. 1 and 2;

FIG. 4 is a diagrammatic view illustrating operation of the load sensing portion of the baler;

FIG. 7 is a schematic diagram illustrating the power supply for the control circuitry;

FIG. 8 is a schematic diagram illustrating the activating circuit for the power supply;

FIG. 9 is a schematic diagram illustrating the right plunger arm sensor's input buffer;

FIG. 10 is a schematic diagram illustrating the left plunger arm sensor's input buffer circuitry;

FIG. 11 is a schematic diagram illustrating the stuffer cycle sensor's input buffer circuitry;

FIG. 12 is a schematic diagram illustrating the output buffer for polling the plunger arm sensors;

FIG. 13 is a schematic diagram illustrating the program monitor circuitry;

FIG. 14 is a flow diagram of a portion of the program for the loading monitor computer program;

FIG. 14a is a flow diagram of an interrupt subroutine of the loading monitor computer program.

DETAILED DESCRIPTION OF THE ILLUSTRATED EMBODIMENT

I. Plunger Arms and Sensors—FIGS. 1-5

Figure 1:
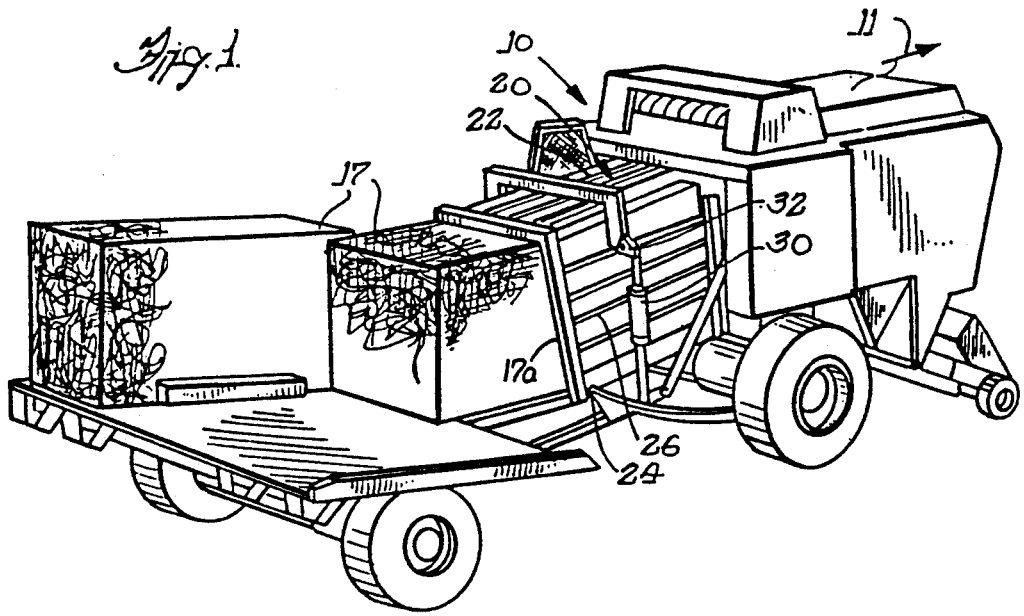
FIG. 1 is a rear perspective view of a baler incorporating the principles of the present invention.
Figure 2:
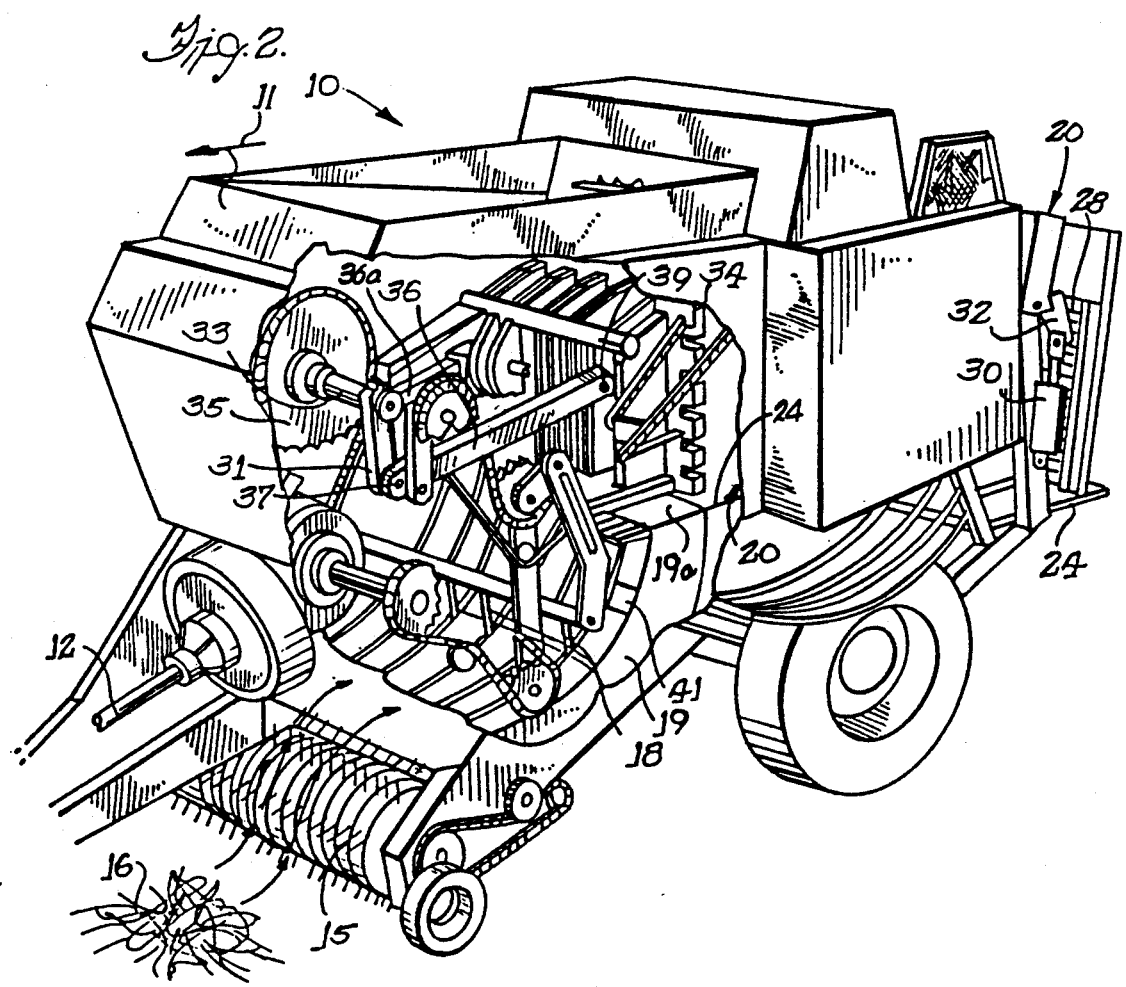
FIG. 2 is an enlarged front perspective view of the baler of FIG. 1 partially broken away and illustrating further details thereof.

Referring now to the drawings and initially to FIGS. 1 and 2 a baler is designated generally by the reference numeral 10. Generally speaking, this baler 10 is pulled in a direction 11 by suitable means such as a tractor (not shown). A main drive shaft 12 is utilized to operate the baler 10 with power from the tractor power take-off (PTO).

The baler 10 includes a pickup 15 which delivers forage material or hay 16 from the field to be further processed into bales 17 here shown exiting the rear of the baler 10. In this regard, the picked up crop material is preferably packed into a duct 19 by means not shown to prepare a carefully shaped "charge" which is then acted upon by a stuffing fork 18 to load the charge up into a bale chamber 20. The width and length of the charge substantially correspond to the width and height respectively of the bale chamber.

The bale chamber 20 comprises fixed top and bottom wall members 22, 24 and a pair of inwardly compressible opposed side wall members 26 and 28. Suitable means such as one or more hydraulic pistons 30 are coupled with suitable linkages 32 to effect relatively inward and outward movement of the side walls 26, 28 to control the width of the bale discharge opening 17a. At the same time, generally axial or longitudinal compression of the hay in the chamber 20 is effected by an axial or longitudinally reciprocable plunger 34 which is axially or longitudinally driven by a pair of suitable plunger arms 36 and 36a. Each time the stuffer 18 loads a new charge into the bale chamber 20 the plunger 34 packs the charge rearwardly against previously compacted materials and, in so doing, incrementally moves the entire mass of materials rearwardly toward and through the restricted opening 17a (which provides resistive back pressure for the plunger 34 to work against).

The foregoing moving components of the baler 10 are linked by suitable chain drives or the like to be driven from the main power shaft 12. Accordingly, as the reel 15 rotates to take up the previously windrowed hay 16, and delivers it to the duct 19, the stuffer 18 periodically traverses the duct 19, to load densified and shaped charges of the crop material into the baling chamber 20.

It will be noted that the plunger arm 36 is driven by a crank 31 which is in turn rotated by a shaft 33 affixed to a sprocket wheel 35. (Although not shown in detail, it is to be understood that a similar construction exists for the arm 36a.) The arm 36 is provided with bearings 37 and 39 at respective ends thereof to translate this rotary motion to axial motion of the plunger 34. A suitable sensor diagrammatically illustrated at 41 may be utilized to detect the advanced position of stuffer 18 for delivering a charge of material to bale chamber 20. It will be understood that when the stuffer 18 is advanced in this fashion, the plunger 34 and plunger arms 36, 36a, will be fully withdrawn and hence in a noncompressed condition to allow ingress of the charge to the bale chamber 20. As will be seen later, the signal from this sensor 41 may be utilized as a suitable indication of the uncompressed condition of plunger arms 36, 36a for zeroing the load sensing apparatus after each compression or load measurement.

It is desirable to obtain a uniform density in the bales produced by the baling chamber 20. Accordingly, the prior art has heretofore utilized a hydraulic system as disclosed in U.S. Pat. No. 4,168,659, to sense the need for adjustment of the squeeze cylinders 30 and to make the appropriate adjustment in response to such detection.

Referring now to FIG. 3 a sensor in the nature of a transducer having a pair of relatively movable components for monitoring the compressive force or load on plunger 34 is illustrated in connection with the arm 36. Using the arm 36 as an example, it will be seen in FIG. 3 that each of the plunger arms comprises an elongate generally rectilinear tubular member. This tube includes a pair of similar end walls 40 and 42 and four elongate and similar rectangular side walls such as side wall 44 which define a generally rectangular cross-section of the tube or plunger arm 36. A suitable variable-frequency signal generator or oscillator 46 is provided for producing a signal which varies in frequency in accordance with the compressive force applied to the plunger arm 36 in the axial direction. The axial direction of the member 36 is defined between end walls 40 and 42.

In this regard, the signal generating means or oscillator circuit 46 may be mounted to the plunger arm itself or in any other suitable location. This oscillator circuit 46 is coupled to a variable element in the form of a coil of wire 48 which is provided with a relatively movable ferromagnetic core piece 50. In accordance with the illustrated embodiment, the coil of wire is substantially coaxially mounted within the tubular plunger arm 36 and preferably coupled to an inner surface of the end wall 42. The ferromagnetic core member 50 is coaxially mounted to extend at least partway into the coil 48 by an elongate support rod member 52, preferably of steel. This elongate rod 52 is preferably securely mounted to the opposite end wall surface 40, also coaxially with the tubular plunger arm 36. Hence, the rod member 52 defines means for mounting the ferromagnetic core coaxially within the coil 48. Thus, the rod member 52 comprises one relatively movable component of the transducer-like sensor and the coil 48 comprises a second relatively movable component of the transducer-like sensor.

A quantity of resilient material such as a foam rubber-like material 54 is provided to fill the interior volume of the plunger arm 36 intermediate the steel rod 52 and side walls 44 thereof to hold the rod in the substantially coaxial alignment just described.

From the foregoing it will be appreciated that the amount of compressive force applied to the plunger arm during compression of the charge in the baling chamber 20 will bear a given, though not necessarily linear, relationship with the amount of axial compression, that is, a reduction in axial length, of the rectangular tubular plunger arm 36. Stated alternatively, the plunger arm 36 may be generally viewed as a structural member to which a load force is applied. Hence, the reduction in length of a given dimension of the structural member in response to this load or force is measured by the apparatus. Still more generally, it provides means for measuring a change in the relative displacement or position between any two relatively movable points, for example coaxially aligned points in the end walls 40 and 42 of the tubular plunger arm 36. Hence, the relative position of the ferromagnetic core 50 with respect to the coil 48 will also vary or change by a corresponding, but again not necessarily linearly, related amount.

Referring briefly to FIG. 4, as previously mentioned the sensor arrangement may advantageously be used with both of a pair of plunger arms 36, 36a, commonly employed in a baling machine such as the machine 10 of FIGS. 1 and 2. A suitable controller 50 may be utilized to control the flow of hydraulic fluid to the cylinders 30 which control the positioning of the sides 24, 26 of the baling chamber as previously described. Such controller 50 may be of simple design and readily apparent to one of ordinary skill in this art; therefore, design details of such controller are not elaborated upon herein.

As just described, a number of non-linear relationships exist between the load or force applied to the plunger arm 36 and the frequency of the signal produced by the oscillator circuit 46. Advantageously, the present invention includes a novel measuring circuit means, illustrated in FIG. 5, responsive to the frequency-variable signal produced by the sensor arrangement of FIG. 3 for producing a load signal which corresponds to the compressive load on the plunger arm 36. Moreover, this measuring circuit includes novel linearizing means responsive to a plurality of the frequency-variable signals developed in response to a corresponding plurality of known compressive forces applied to the plunger arm member 36 for producing a suitable linearizing control signal or signals to effectively linearize the response of the foregoing components for the particular plunger arm 36 with which they are associated. Hence, accurate and repeatable load calculations may then be made by calculating means of the novel measuring circuit based upon the frequency-variable signal developed in response to loads applied in operation and the linearizing control signals previously developed and stored.

Figure 5:
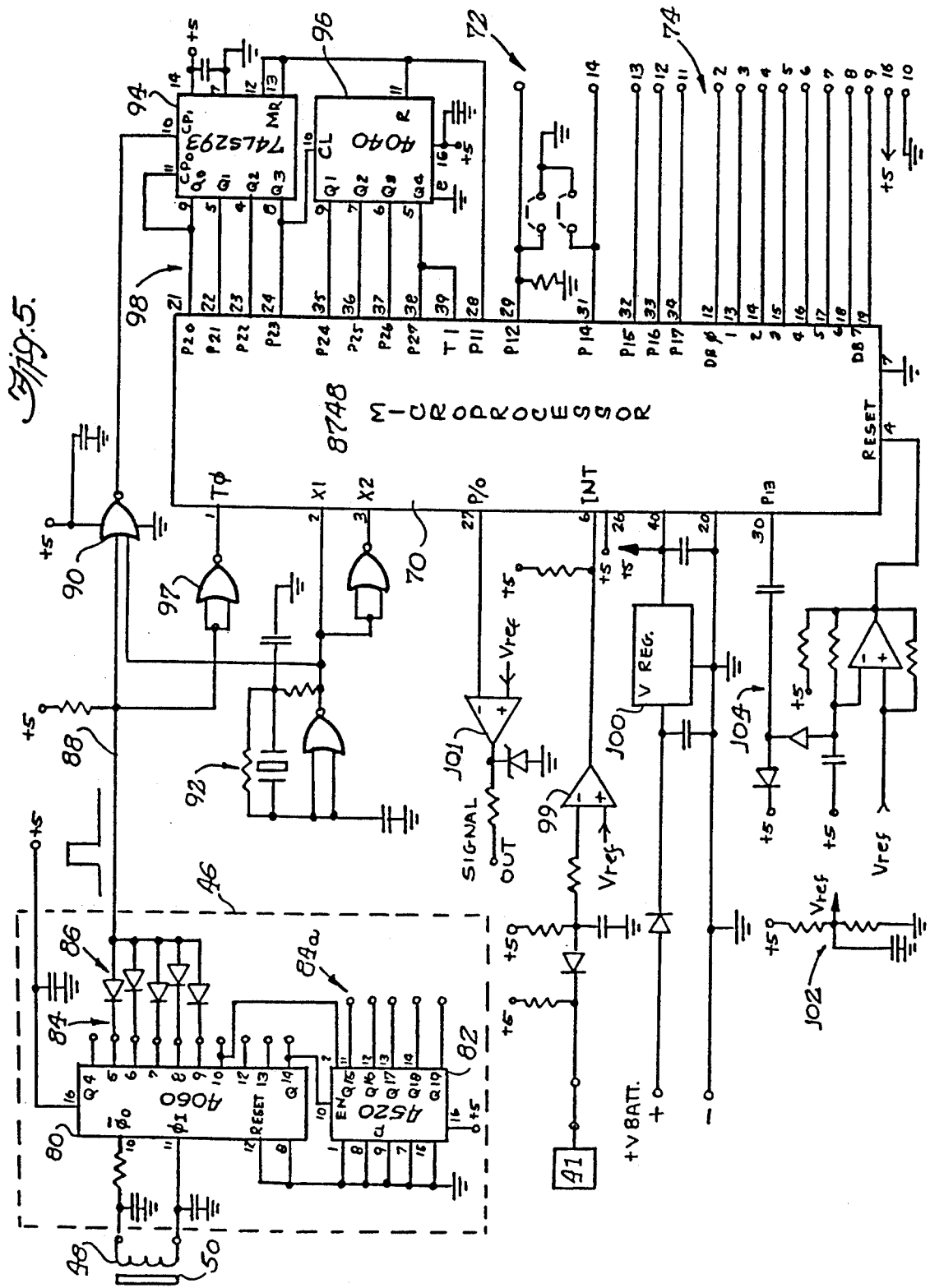
FIG. 5 is a schematic diagram illustrating a load sensing circuit in accordance with a preferred form of loading monitor for the baler.
Figure 6:
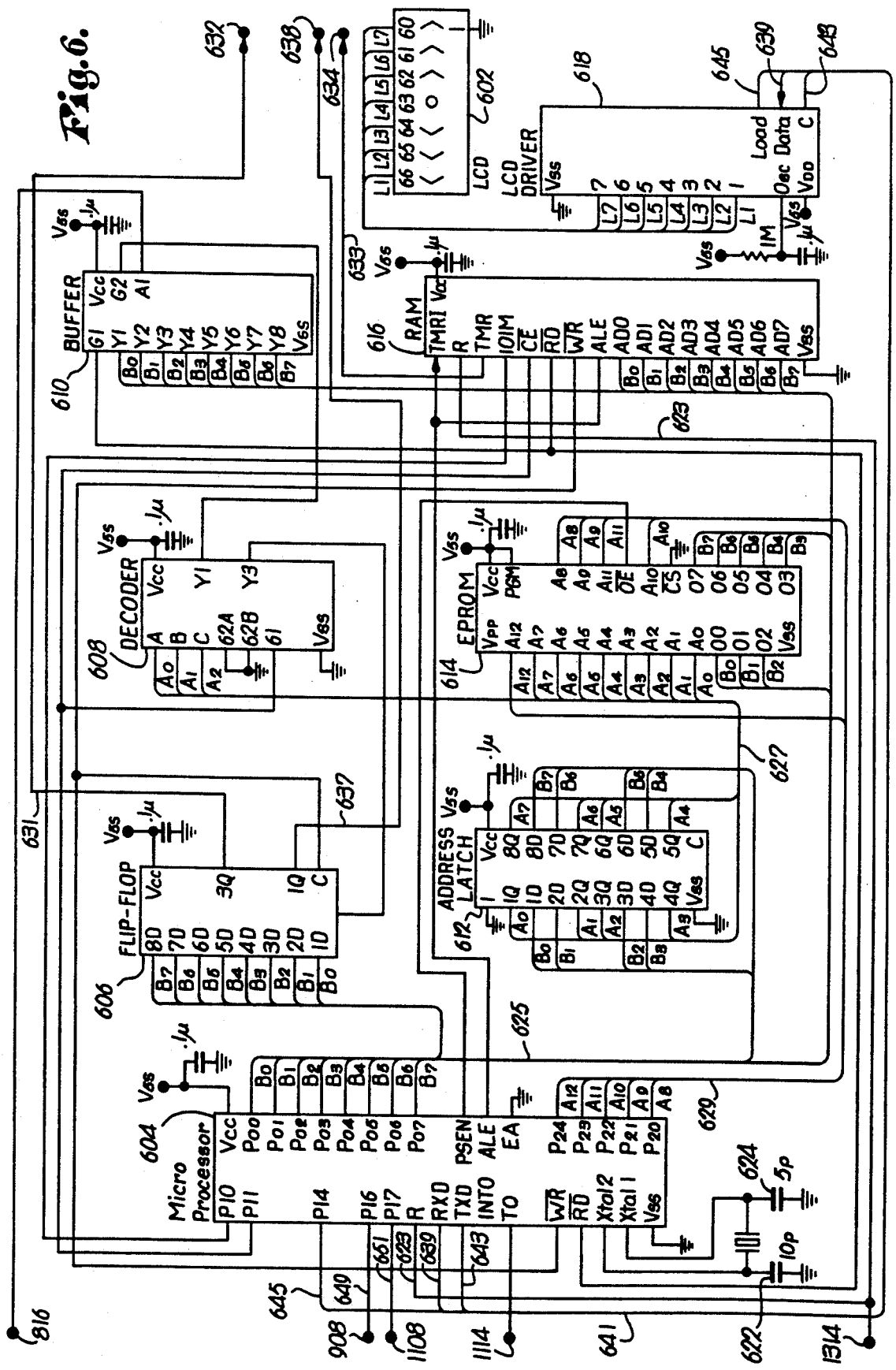
FIG. 6 is a schematic diagram illustrating the microcomputer circuitry for the loading monitor.

Advantageously and referring now more particularly to FIG. 5, the foregoing operations may be simply and economically carried out by a suitable microprocessor or microcomputer circuit component designated generally by the reference numeral 70. In the illustrated embodiment a microcomputer of the type generally designated 8748 is utilized. This microprocessor or microcomputer includes one or more suitable programmable register means, in the form of programmable read only memory, for receiving and storing linearizing data or information developed in response to the frequency-variable signals produced in response to known compressive forces applied to the structural member or plunger arm 36. This linearizing data may then be utilized together with the oscillatory or frequency-variable signals developed in operation for producing accurate and repeatable calculations of the axial loads being applied to the plunger arm 36 during operation.

The linearizing operation may be simply and rapidly carried out with respect to each plunger arm or other relatively movable or displaceable member or members by the simple expedient of applying a plurality of known loads to effect different relative displacements or movements, and recording the resulting data. Hence, the recorded data may thereafter be utilized to accurately measure loads applied to displacements experienced during operation. In this regard, the microprocessor 70 may be suitably programmed to carry out the linearizing operation, or alternatively, another processor or computer may be utilized in conjunction with the microprocessor 70 to effect the linearizing operation.

To this end, the processor 70 is provided with a plurality of input/output (I/O) ports 72 and an 8-bit data bus 74 to communicate with a suitable computer (not shown) to effect the linearizing operation. In this regard, the use of a second computer permits the usage of a simpler and relatively cheaper microprocessor component 70, such as the microcomputer of the type 8748 previously described.

Referring more particularly to FIG. 5, suitable frequency-to-digital converting circuitry is coupled intermediate the coil 48 and the microcomputer or microprocessor 70 to convert the frequency or oscillatory signals developed into digital forms suitable for further processing by the microprocessor 70.

The frequency-to-digital converting circuitry includes a first pair of counters 80, 82, the coil 48 being coupled across suitable terminals of the first counter 80. Selected count outputs 84 of the counter 80 are then coupled by a plurality of diodes 86 to an input line or conductor 88. This conductor 88 feeds one input of a two-input NOR-gate 90 which receives its second input from a high frequency crystal oscillator circuit 92. The output of this NOR-gate 90 is fed to the count input of a second counter circuit which in the illustrated embodiment comprises a pair of sequentially or series-coupled integrated circuit counter components 94 and 96. The count outputs of these latter counters 94 and 96 feeds suitable I/O ports, designated generally 98, of the microprocessor 70.

The first counter component 80 comprises an integrated circuit component of the type generally designated CD 4060. In addition to a counter circuit, this component includes a buffer circuit coupled between terminals 10 and 11 thereof to form an oscillator circuit with the coil 48. These buffer components are then internally coupled with the counter circuit portion of integrated circuit 80 to provide a count output on terminals 84 thereof corresponding to the frequency of the oscillator thus formed. The additional counter component 82 is provided in sequence to form a "programmable" counter with the counter circuit of the integrated circuit component 80. This provides additional terminals 84a from which to select to "program" a suitable signal onto the line 88. In this regard, the duty cycle of the signal produced at line 88 may then be varied or scaled to bear a desired relationship to the frequency developed by the oscillator circuit portion 46.

This variable duty cycle signal in turn gates through a corresponding number of high frequency pulses from the high frequency oscillator circuit 92 at the gate 90. The succeeding counter circuit comprising counters 94 and 96 counts these gated through pluses to deliver a parallel format count to the microprocessor 70. Hence, the parallel count delivered on I/O ports 98 is scaled to bear a preselected relationship with the frequency developed at the oscillator 46, in accordance with the selection of outputs 84, 84a of the counters 80, 82. Accordingly, the programming of the microprocessor enables automatic determination of the frequency of oscillator 46 from the count received at ports 98.

In the illustrated embodiment the zero or low level of the variable duty cycle signal produced on line 88 is utilized to gate pulses through gate 90. The intervening logic high states of this signal are utilized to signal the microprocessor by way of a buffer 97 of the end of one cycle of gated high frequency pulses. Hence, the processor calculates the load based upon the number of counts received at ports 98 intermediate pulses delivered by the buffer 97.

The previously mentioned sensor 41 associated with the stuffer 19 can be used to feed a suitable interrupt (INT) port of the microprocessor 70 by way of an input circuit including an operational amplifier 99 which is provided with a reference level Vref to be described later. However, when plunger sensors 36 and 36a are used in conjunction with the loading monitor discussed in part II below, sensor 41 feeds terminal 1102 (FIG. 11) and terminal 41 (FIG. 5) receives a polling signal instead from terminals 1204 and 1206 (FIG. 12) for plunger sensors 36 and 36a respectively. Similarly, the output control signal developed for the controller 50 is fed out to the terminal designated SIGNAL OUT by way of a similar operational amplifier 101 which is referenced against the same level Vref.

An additional conventional voltage supply including a suitable integrated circuit voltage regulator 100 provides a stable plus 5 volt DC supply for the microprocessor 70 and other circuit components thus far illustrated. This voltage supply is preferably coupled to a vehicle battery (+V BATT) for example, that of the tractor pulling the baler 10. Additionally, a suitable reference DC voltage level Vref is also provided from the regulated plus 5 volts by a suitable resistive voltage divider designated generally by reference numeral 102. This reference voltage and the plus 5 regulated DC volts are fed through a suitable power-up circuit 104 to inputs of the microprocessor for 70 by a power-up or initiating circuit 104 to initiate the microprocessor 70 in accordance with conventional practice. In order to fully illustrate a specific embodiment of the invention, a suitable program or software listing for the microprocessor 70 is reproduced as the Microfiche Appendix to this specification, which Microfiche Appendix is available from the United States Patent and Trademark Office.

II. Loading Monitor—FIGS. 6-15.

The loading monitor of the present invention broadly includes loading monitor display 602 (FIGS. 4 and 6) and control means 199 which forms a part of controller 50. Generally, control means 199 receives data in digital form from plunger sensors 36 and 36a and an operating indication from stuffer cycle sensor 41. Control means 199 produces an output to loading monitor display 602 which indicates to the operator of the baler whether to steer left, right, or maintain the present course of the baler by means of three leftwardly pointing chevrons, three rightwardly pointing chevrons and a center dot respectively. The magnitude of the steering correction required is indicated by how many chevrons are activated.

Control means 199 broadly includes microcomputer circuit 600 (FIG. 6), power supply 700 (FIG. 7), power supply control circuit 800 (FIG. 8), right plunger sensor input buffer 900 (FIG. 9), left plunger sensor input buffer 1000 (FIG. 10), stuffer cycle sensor input buffer 1100 (FIG. 11), plunger sensor poll output buffer 1200 (FIG. 12), and program operating monitor 1300 (FIG. 13).

Figure 15:
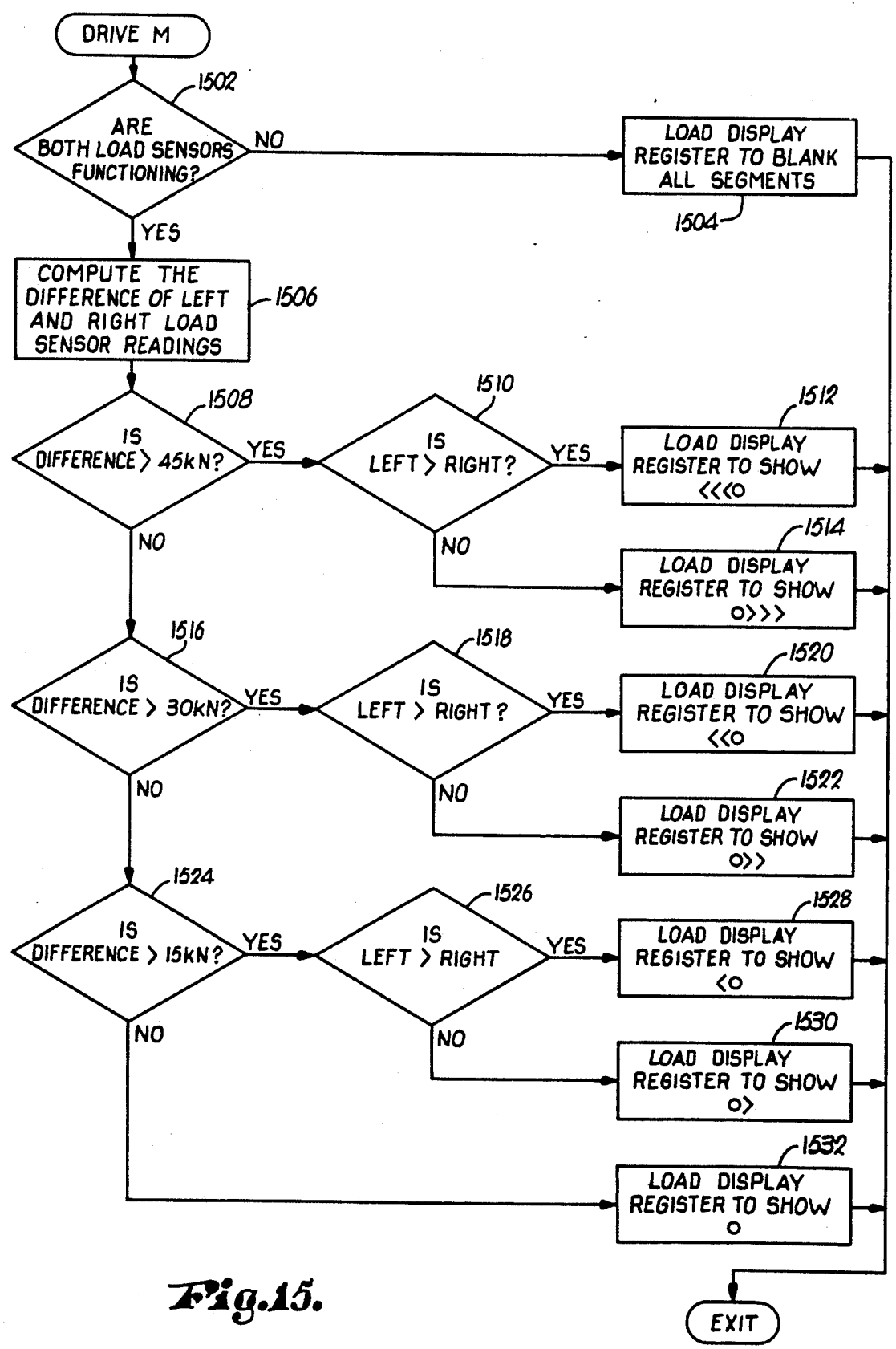
FIG. 15 is a flow diagram of an additional subroutine of the loading monitor computer program.

The structure and operation of the loading monitor in accordance with the present invention is best understood with reference to the computer program flow diagrams of FIGS. 14, 14a, and 15 in conjunction with the circuit diagrams of FIGS. 6-13. In these diagrams, the preferred values of the resistors are indicated in ohms-K representing one thousand and M representing one million—and the values for the capacitors are indicated in farads-u representing microfarads and p representing picofarads.

Referring now to FIG. 7, operating power for all of the circuits of the present invention is advantageously supplied from the twelve volt battery of the tractor pulling the baler. The positive terminal of the battery is connected to terminal 702 and the negative terminal of the battery is connected to terminal 704 which is grounded as shown. Power from terminal 702 is supplied via line 705 to conventional current limiting device 706. Line 711 receives the output from device 706 and is provided with radio frequency suppression by bead inductor 712 and grounded capacitor 714. Line 711 supplies protected, unswitched twelve volt supply to terminal V12u. Device 716 connected between line 711 and ground as shown provides transient and overvoltage suppression and is supplied by SemiCon Company part no. S5KP28A.

Diode 718 is connected to line 711 and supplies the subcircuit which provides output voltages at terminals V5u(+5 v.d.c. unswitched), Vref1(+2.5 v.d.c.), and Vref2(+2.73 v.d.c.). Twelve volt output from diode 718 is supplied via line 719 to one side of grounded capacitor 720, one side of resistor 722, and to the collector of transistor 724 type 2N6515. Line 725 connects the other side of resistor 722 with the base of transistor 724 and grounded shunt regulator 726 type TL431 as shown.

Regulating voltage is supplied to regulator 726 via line 727 which is nominally +2.5 v.d.c. as determined by the voltage divider network composed of series connected resistors 728, 730, and 732. Line 727 also interconnects resistors 730 and 732.

The other side of resistor 732 is grounded as shown. The side of resistor 728 opposed from resistor 730 is connected via line 733 to the emitter of transistor 724, one side of grounded capacitor 734, and terminal V5u. Capacitor 734 is used to provide some ripple filtering.

In operation, a drop in +5 v.d.c. output voltage at terminal V5u causes a drop in voltage on line 727 which reduces the conductance of regulator 726 and increases the base current to transistor 724 thereby increasing the output from the emitter of transistor 724 which increases the voltage at terminal V5u. Conversely, an increase in transistor 724 output voltage above +5 v.d.c. increases the voltage on line 727 which increases conductance on regulator 726 and reduces base current to transistor 724 to lower its output voltage.

The positive terminal of operational amplifier 736 is connected to line 737 between resistor 728 and 730 and supplies terminal Vref2 via line 739 at +2.73 v.d.c. as determined by the preferred values of the divider network of resistors 728-732.

Similarly, the positive terminal of operational amplifier 740 is connected to line 727 and supplies voltage to Vref1 via line 741 at +2.5 v.d.c.

The output voltages on terminals V12u, V5u, Vref1, and Vref2 are normally on continuously whenever battery power is connected at terminals 702 and 704 and as such provide startup power for control means 199.

Referring now to FIG. 8 and power up step 1402 of FIG. 14, when the operator of the loading monitor wishes to start up the unit, the operator depresses conventional panel-mounted on/off membrane switch 802, one side of which is supplied from terminal V5u via line 803. When the operator depresses switch 802 line 805 goes "high" (+5 v.d.c.). Diodes 806 and 808 are connected as shown to provide static suppression. Grounded resistor 810 is connected to line 805 to pull down line 805 to zero volts when switch 802 is not depressed. The high signal from switch 802 is supplied via resistors 812 and 814 respectively to terminal 816 and terminal C of "D" type flip-flop with set and reset 818.

Data terminal D of flip-flop 818 is grounded "low" (0 v.d.c. so that the high signal at clock terminal C causes output terminal Q to go low on line 819 and causes output terminal $\bar{Q}$ to go high via line 821 to terminal 822.

When terminal 822 goes high indicating that switch 802 has been depressed, line 741 (FIG. 7) goes high to supply the base of transistor 742 (type MPSA06) via current limiting resistor 744. When transistor 742 switches on, the path is completed from twelve volt supply on line 711 through diode 746, pull-up resistor 748, current limiting resistor 750, and through transistor 742 to ground as shown. Additionally, a parallel path is provided from diode 746 through the emitter to the base of transistor 752 which switches on transistor 752.

When transistor 752 switches on, twelve volt "switched" power is supplied via line 753 to terminal V12s. Grounded capacitor 754 is connected to line 753 and provides a current source in the event of power outage and allows orderly shutdown of microcomputer circuit 600.

Switched twelve volt power via line 753 also supplies switching device 756. Line 753 additionally supplies the emitter of transister 760 and resistor 762. Device 756 is a fixed-frequency, viable duty cycle, D.C. to D.C. converter Motorola part no. MC34063 and includes eight terminals 1 through 8. Terminals 2 and 4 are grounded as shown Terminal 3 is grounded by way of capacitor 758 which is a timing capacitor for the internal oscillator of device 756 generating a square wave having a maximum 50% duty cycle. Terminals 6 and 7 receive twelve volt power via line 753. The other side of resistor 762 is coupled via line 763 to the base of transistor 760, and to terminals 1 and 8 of device 756.

In operation, output terminal 1 of device 756 switches high according to the duty cycle of its internally generated square wave up to a maximum of 50%. Terminal 1 supplies the base of transistor 760 and switches on transistor 760 when terminal 1 is high. In turn, transistor 760, when switched on, supplies twelve v.d.c. power to inductor 762 via line 763. The other side of inductor 762 is coupled with capacitor 764 via line 765 and supplies terminal V5s. One side of resistor 766 is coupled to line 765, and the other side is coupled via line 767 to grounded resistor 768 and terminal 5 of switching device 756. Resistors 766 and 768 form a voltage divider network to provide voltage control feedback via line 767 to device 756. This feedback determines the duty cycle of the output at terminal 1.

When transistor 760 is switched on, energy is stored in the magnetic field of inductor 762 and in the electric field of capacitor 764. As the voltage on line 765 begins to rise, the duty cycle at terminal 1 of device 756 decreases and inductor 761 and capacitor 764 begin to discharge to maintain the voltage at terminal V5s. When the regulated voltage drops below the set point as determined by the divider network of resistor 766 and 768 and when the internal oscillator is in its "on" phase of the duty cycle, device 756 switches on transistor 760 to resupply energy to inductor 762 and capacitor 764. In this way, the primary power demands of control means 199 are met from terminal V5s with minimal heat production. This arrangement is preferred because it allows a sealed and compact plastic case.

Continuing with the power up sequence of step 1402, program operating monitor 1300 (FIG. 13) serves to initiate microcomputer circuit 600 when the power supply at terminal V5s switches on. Monitor 1300 includes dual monostable multivibrator type 74HC123A, having subunits 1302 and 1304 which are conventionally connected and configured as shown in FIG. 13.

Subunit 1302 includes AND Gate 1306 with inverted terminal A connected to capacitor 1308 and grounded resistor 1310. The other side of capacitor 1308 connects to terminal V5s. Terminal B of AND 1306 is also connected to V5s. When V5s goes high, resistor 1310 presents an initial voltage spike to inverted input A of AND 1306. As capacitor 1308 charges up, the falling edge of the spike presented by resistor 1310 switches terminal $\bar{Q}$ low for about 100 milliseconds.

Terminal $\bar{Q}$ of subunit 1302 is connected to inverted clear terminal CLR of subunit 1304 via line 1311. When terminal $\bar{Q}$ of subunit 1302 goes low, terminal $\bar{Q}$ of subunit 1304 goes high via line 1313 to terminal 1314 which resets microcomputer circuit 600.

After 100 milliseconds, when $\bar{Q}$ of subunit 1302 high, the timing cycle of subunit 1304 is initiated and $\bar{Q}$ of subunit 1304 goes low which allows circuit 600 to begin execution of its program. This marks the end of power up step 1402.

At the end of about 2.2 seconds, $\bar{Q}$ of subunit 1304 will again go high to reset microcomputer circuit 600 unless subunit 1304 receives a reset signal at terminal 634 from microcomputer circuit 600 via line 1315 to terminal B of AND gate 1316. The signal at terminal 632 is triggered by the operating program of circuit 600 so that if the program fails for any reason and subunit 1304 does not receive a reset signal then terminal 1314 goes high to reset circuit 600. In this way, circuit 1300 operates as a "watchdog" to insure proper execution of the operating program.

Microcomputer circuit 600 includes microprocessor 604 type 80C31, octal "D" flip-flop 606 type 74HCT377, three-to-eight line decoder 608 type 74HCT138, octal buffer and line driver 610 type 74HC541, address latch 612 type 74HCT373, electrically programmable read-only-memory (EPROM) type 27C64, auxillary random access memory with timer and input/output ports 616 type 81C55, and liquid crystal display driver 618 manufactured by National Semiconductor part no. MM5483. Components 604-618 are conventionally interconnected as shown in FIG. 13. Microprocessor 604 includes an external crystal 620 and capacitors 622 and 624 connected as shown to generate a 12 megahertz time-base for microprocessor 604.

The reset signal from monitor 1300 is received at terminal 1314 and transmitted to the reset terminals of microprocessor 604 and RAM 616 via line 623. When the reset signal goes off, the program illustrated by the flow diagrams of FIGS. 14 and 15 begins to execute. The operating program is stored in EPROM 614.

Data bus 625 includes lines B0 (least significant bit), B1, B2, B3, B4, B5, B6, and B7 and interconnects microprocessor 604, flip-flop 606, buffer 610, address latch 612, EPROM 614, and RAM 616 as shown. Low address bus 627 includes lines A0 (least significant bit), A1, A2, A3, A4, A5, A6, and A7 and interconnects address latch 612 with EPROM 614 and decoder 608 as shown. Additionally, high address bus 629 includes lines A8, A9, A10, and A11 (most significant bit) and interconnects microprocessor 604 with EPROM 614 as shown. Other lines of the circuit are shown individually or bundled as needed for drawing clarity.

In step 1404 (FIG. 14), the operating program forces the plunger sensor poll to an inactive state by switching terminal 3Q of latch 606 low via line 631 to terminal 632. Referring now to FIG. 12, when terminal 632 goes low, this ensures that transistor 1202 is switched off so that terminals 1204 and 1206 connected to the collector of transistor 1202 via line 1207 are high because of the pull-up resistor adjacent terminal 41 (FIG. 5). Terminals 1204 and 1206 connect with terminal 41 of the respective plunger load sensors 36 and 36a (FIG. 5).

Circuit 1200 also includes grounded EMI suppression filter 1208 coupled to line 1207 which is manufactured by MuRata Company part no. DS710-D-223S 12-72. Grounded resistor 1210 is coupled to the emitter of transistor 1202, base matching resistor 1212 is connected between terminal 632 and the base of transistor 1202 in line 1213. Series coupled diodes 1214 and 1216 are connected to line 1213 and to ground as shown and in combination with grounded resistor 1210 connected to the emitter of transistor 1202 provide overcurrent protection for transistor 1202.

In step 1406 the operating program initializes the RAM 616 values to zero.

In step 1408, initialization of the "watchdog" circuit (FIG. 13) starts a timer in RAM 616 that, one millisecond later, generates a single 10 microsecond pulse at terminal TMR which resets "watchdog" monitor circuit 1300.

In step 1410, the program initializes a ten millisecond interrupt timer which is part of microprocessor 604.

At this point the program enters the main loop at step 1412 and reads the status of the on/off switch received at terminal A1 of latch 610 via line 635 from terminal 816. If terminal 816 is high indicating that the on/off switch is depressed (step 1414) the program enters the power shutdown routine beginning with step 1416 and incorporates a three second software delay in step 1418 to ensure the on/off switch was not depressed inadvertently. At the end of three seconds, terminal 1Q of latch 606 goes high via line 637 to terminal 638.

Referring now to FIG. 8, terminal 638 goes high via line 823 through diode 824 to NAND gate 826. Diode 824 and grounded resistor 828 connected to line 823 between diode 824 and NAND 826 are provided to insure no voltage when terminal 638 is off. The other leg of NAND went high when $\overline{Q}$ of flip-flop 818 went high during power up step 1402. Grounded capacitor 830, and resistor 832 in parallel with diode 834 connected as shown in FIG. 8 are placed in line 835 between terminal $\overline{Q}$ of flip-flop 818 and NAND 826 to provide a slight time delay when terminal $\overline{Q}$ initially goes high to allow circuit 600 to initialize before this leg of NAND 826 goes high. This is necessary because, before circuit 600 is initialized, terminal 638 could be momentarily high before being initialized which would signal circuit 800 to shut down the power supply.

When terminal 638 goes high, NAND 826 output goes low to NAND 836. The other input to NAND 836 is received from terminal Q of flip-flop 818 via line 819, resistor 838, and inverter 840. Grounded capacitor 842 is connected between resistor 838 and inverter 840 to provide, in combination with resistor 838, a slight time delay when terminal Q of flip-flop 816 changes state. During power up, terminal Q went low and the output of inverter 840 to NAND 836 went high. Thus, when the output from NAND 826 goes low, the output from NAND 836 goes high, and the output from inverter 844 goes low to the inverted set terminal S of flip-flop 818. At this point, terminal $\overline{Q}$ goes low to terminal 822 which switches off the power supply (FIG. 7).

If the on/off switch in step 1414 is not depressed, the program moves to step 1420 which determines whether the stuffer cycle is active. If no, the program jumps to step 1424. If yes, the program reads the most recent plunger sensor data stored in memory (step 1422).

The next step in the operating program is step 1424 which is the subroutine of FIG. 15 entitled DRIVEM. The software first determines whether both plunger arm sensors have transmitted valid data in step 1502. If either load sensor has transmitted invalid data, the program loads the display register of microprocessor 604 with data to blank all of the liquid crystal segments (step 1504) and then exits subroutine DRIVEM.

If both load sensors have transmitted valid data, the subroutine moves to step 1506 and computes the difference between the left and right load sensor readings as previously received at terminals P16 and P17 of microprocessor 604. In step 1508, the program first determines if the difference between the left and right load sensor readings is greater than 45 kilonewtons. If yes, the program moves to step 1510 and determines whether the left load sensor reading is higher than the right. If yes, the program in step 1512 loads the display register with data to show the center dot of the display and the three leftwardly pointing chevrons. If the left sensor reading is not higher than the right sensor reading, the program moves to step 1514 and loads the display register to display the center dot and the three rightwardly pointing chevrons.

If the difference between the load sensor readings is not greater than 45 kilonewtons in step 1508 the program moves to step 1516 and determines whether the difference is greater than 30 kilonewtons. If yes, step 1518 determines whether the left sensor reading is greater than the right sensor reading. If yes, the program moves to step 1520 and loads the display register to show the center dot and two leftwardly pointing chevrons. If the left load sensor reading is not higher than the right, the program moves from step 1518 to step 1522 to load the display register to show the center dot and two rightwardly pointing chevrons.

If the difference between the load sensor readings is not greater than 30 kilonewtons in step 1516, the program moves to step 1524 and determines whether the difference is greater than 15 kilonewtons. If yes, step 1526 determines whether the left sensor reading is greater than the right sensor reading. If yes, the program loads the display register to show the center dot and one leftwardly pointing chevron. If the left load sensor reading is not greater than the right load sensor reading, the program moves from step 1526 to step 1530 and loads the display register to show the center dot and one rightwardly pointing chevron. If the difference between the two load sensor readings is not greater than 15 kilonewtons, which indicates that the baler chamber is being loaded with a balanced load, the program moves from step 1524 to step 1532 to show only the center dot which indicates that the operator should hold the present course in steering the baler. The program then exits subroutine DRIVEM.

In step 1426 the program determines whether a software display counter has decremented to a reading of zero, which indicates that 500 milliseconds has elapsed since the last update of the drive meter display 602. If the display counter has decremented to zero, the program moves to step 1426 and reinitializes the software counter to an initial value of 50 and then transfers the data in the display register to the liquid crystal display driver 618.

Microprocessor 604 delivers the data for the display from terminal RXD over line 639 which forms a part of cable 641 to terminal Data In of display driver 618. Additionally, microprocessor 604 sends serial clock data over line 643 included in cable 641 to clock terminal C of display driver 618. The serial clock provides information to synchronize the receipt of serial data into driver 618.

When microprocessor 604 has completed delivery of data to LCD driver 618, a serial load signal is sent from terminal P16 via 645 to the LOAD terminal of driver 618 which activates driver 618 to transmit the data to display 602. Display 602 includes the custom-shaped liquid crystal chevron and center dot segments but is otherwise conventional in structure and operation.

In this particular application, only seven bits of data are required corresponding to the seven segments of liquid crystal display 602, that is, three leftwardly pointing chevrons, three rightwardly pointing chevrons, plus one center dot. Driver 618 sends the seven bits of data from terminals 1–7 corresponding to lines L1, L2, L3, L4, L5, L6, and L7, which make up cable 647 delivering the data to terminals 66, 65, 64, 63, 62, 61, and 60, respectively, of liquid crystal display 602. If a particular bit of data is high, for example, L1, this voltage energizes the leftmost chevron corresponding to terminal 66. This polarizes the ambient light leaving the liquid crystal display and causes the segment 66 to appear dark in contrast to the lighter background and thereby makes the segment visible to the operator of the baler.

If the display counter as determined in step 1426 is not decremented to zero, steps 1428 and 1430 are bypassed and the program loops back to step 1412.

Also incorporated as part of the operating program is an interrupt subroutine entitled "10 millisecond timer interrupt" (in FIG. 14a). This subroutine interrupts the loop of steps 1412 through 1430 every ten milliseconds. In the interrupt subroutine, step 1432 causes terminal TMR of RAM 618 to go high via line 633 to terminal 634 which resets the watchdog timer of circuit 1300. If, for example, the program of FIGS. 14 and 15 is not functioning properly, step 1432 most likely will not occur which will prevent resetting of the watchdog timer. This in turn will reset RAM 616 and microprocessor 604 to reinitialize the microcomputer circuit 600.

In step 1434, the software counter is decremented one unit, for example, from 50 to 49. Fifty passes decrements the counter to zero which corresponds to 500 milliseconds. Thus, the display in 1426 through 1430 is updated every 500 millisteps seconds.

Step 1436 reads the status of the on/off push button at terminal A1 of latch 610 as received via line 635 from terminal 816.

In step 1438, the program next reads the stuffer cycle input from the stuffer cycle sensor 41 received at terminal T0 of microprocessor 604 via circuit 1100. Note that in the use of the loading monitor in the present invention, the output from stuffer cycle sensor 41 is not connected to terminal 41 of FIG. 5 but rather is provided as an input to the loading monitor. Terminal 41 of FIG. 5 receives its polling signal, instead, from plunger sensor poll circuit 1200.

Microprocessor 604 receives a signal input from stuffer cycle sensor 41 at terminal T0 via stuffer cycle input buffer circuit 1100. Preferably, sensor 41 is a conventional magnetic sensor (Wabash Company variable reluctance sensor #60-0128) incorporating a magnet and an inductive coil incorporated as part of sensor 41 such that as finger 18 (FIG. 2) passes by sensor 41, a voltage pulse is induced at terminal 1102 of circuit 1100.

This induced voltage signal at terminal 41 is buffered and converted to digital form by circuit 1100 (FIG. 11). Operational amplifier 1104 is used as a comparator in circuit 1100 and is connected as shown using resistors 1106, 1108, 1110, and 1112 connected with Vref1(+2.5 v.d.c.), Vref2(+2.73 v.d.c.), and V5u (+5 v.d.c.). With these interconnections, the output of comparator 1104 is biased high via line 1113 to terminal 1114.

When sensor 41 is activated, it produces rising voltage peaking at about 1.5 v.d.c. which is transmitted from terminal 1102 via resistor 1116 and capacitor 1118 to the negative terminal of comparator 1104. Diode 1122 is chosen and configured so that the 1.5 input voltage at terminal 1102 produces a 0.7 rise in voltage at the negative terminal of comparator 1104 whereby this voltage rises from 2.5 to 3.2 volts. This voltage level exceeds the reference voltage of 2.73 on the positive terminal of comparator 1104. When this occurs, the output of comparator 1104 goes low as an indication to microprocessor 604 that a stuffer cycle has occurred. Circuit 1100 also includes grounded EMI supression filter 1120 and grounded transient suppressing diodes 1122 and 1124 all connected as shown in FIG. 11.

If the stuffer sensor cycle is active, the software reads the plunger load data in step 1422. If the stuffer cycle is not active, step 1422 is bypassed.

If the signal at terminal T0 is low indicating that the stuffer cycle is active in step 1440, the program moves to step 1442 to poll the load sensors 76 and 36a. The load sensors are polled when the program causes terminal 3Q of latch 606 to go high via line 631 to terminal 632. When terminal 632 goes high, transistor 1202 (FIG. 12) turns on and the outputs at terminals 1204 and 1206 go low to terminal 41 of sensors 36 and 36a (FIG. 5). When this occurs, microprocessor 70 of FIG. 5 for each load sensor 36 and 36a reinitiates its cycle of data transmission at the terminal labeled SIGNAL OUT.

The data from microprocessor 70 is received respectively at terminal 902 of FIG. 9 for the right load sensor and terminal 1002 of FIG. 10 for the left load sensor. This data is received as 0 to +5 v.d.c. signals with bit data 400 microseconds wide about every 30 milliseconds.

The bit data received at terminal 902 is transmitted to inverter 904 via line 905 and resistor 906 with the output of 904 being conveyed, via line 907 to terminal 908. The balance of circuit 900 is connected as shown including filter suppressor 910, resistor 912, capacitor 914, and capacitor 916. Circuit 900 thus serves to buffer the input from microprocessor 70 and also serves to invert the bit data into the form required by microprocessor 604.

Circuit 1000 is identical to circuit 900 and components are analogously numbered 1002–1016.

Right load sensor data is received by microprocessor 604 at terminal P16 via line 649 from terminal 908. Similarly, microprocessor 604 receives left load sensor data at terminal P17 via line 651 from terminal 1008.

In step 1442, after the program polls load sensors 36 and 36a, the interrupt subroutine ends to resume the main loop of the program. In step 1440, if microprocessor 604 is not receiving a logic low signal at terminal T0, the stuffer cycle is assumed inactive and the program bypasses step 1442 and does not poll the load sensors.

We claim:

1. In a mobile crop baler adapted for picking up crop materials from the ground and feeding the same into a baling chamber as the baler is moved across the field for compaction by a plunger reciprocable in the chamber through compaction and retraction strokes, apparatus for monitoring whether materials introduced into the chamber have been loaded evenly from side to side thereof comprising:

means responsive to differential in structural loading on said plunger at spaced locations thereof during compaction strokes of the plunger caused by unequal volumes of material in the chamber at said laterally spaced locations of the plunger for generating an output related to said loading differential; and means for receiving said output and performing a baling-related function in response thereto, said means for receiving the output and performing a baling-related function in response thereto including a display device for presenting a visually perceivable signal to the operator of the baler, said display device including visual indicator means for indicating the direction in which the operator should steer the baler in order to correct the uneven loading of materials in the chamber, said visual indicator means being disposed and operable to indicate a variable degree of unevenness in the loading corresponding to the magnitude of said loading differential, said visual indicator means including a set of several left indicating liquid crystal segments and a set of several right indicating liquid crystal segments, said visual indicator means further including activating means for causing the number of said left or right segments activated at any one time to correspond to the magnitude of said loading differential and the extent and direction of corrective steering of the baler needed to return the loading to an even condition.

2. In a crop baler as claimed in claim 1, wherein said visual indicator means further includes a center liquid crystal segment disposed between said left and right segments, said center segment when activated indicating even loading of the baling chamber.

3. In a cop baler as claimed in claim 1, wherein said left segments are provided with means for displaying the same in the form of a leftwardly pointing arrow and said right segments are provided with means for displaying the same in the form of a rightwardly pointing arrow.

4. In a mobile crop baler adapted for picking up crop materials from the round and feeding the same into a baling chamber as the baler is moved across the field for compaction by a plunger reciprocable in the chamber through compaction and retraction strokes, apparatus for monitoring whether materials introduced into the chamber have been loaded evenly from side to side thereof comprising:

means responsive to differential in structural loading on said plunger at spaced locations thereof during compaction strokes of the plunger caused by unequal volumes of material in the chamber at said laterally spaced locations of the plunger for generating an output related to said loading differential; and means for receiving said output and performing a function in response thereto, said plunger being provided with a pair of laterally spaced structural members associated with means for driving the plunger through its compaction and retraction strokes, said means for generating an output including structure associated with each of said members, said structure for each member including electrical circuit means including transducer means having a pair of relatively movable components operable upon relative movement therebetween caused by loading in the member to change an electrical parameter experienced by said circuit means.

5. In a mobile baler:

an elongated, fore-and-aft extending baling chamber having a floor provided with an opening across the width of the chamber for admitting successive charges of crop materials into the chamber from the bottom thereof;

means for picking up crop materials from the field as the baler is advanced across the latter and feeding successive charges of the materials up into the baling chamber through said opening to fill the chamber from side-to-side and top-to-bottom with each charge, said chamber having a restricted discharge opening at its rearmost end through which completed bales issue from the baler;

a plunger in said chamber generally adjacent the forward end thereof and spanning the chamber from side-to-side and top-to-bottom, said plunger having drive means associated therewith for reciprocating the plunger longitudinally of the chamber through compression and retraction strokes for packing newly introduced charges of materials rearwardly in the chamber against previously compacted materials and incrementally advancing the compacted materials toward and through the discharge opening;

load detection means associated with said plunger for detecting structural loading at laterally spaced locations of the plunger during compression strokes of the plunger;

output means operably coupled with said load detection means for producing a pair of electrical outputs corresponding to the detected loading of the plunger;

control means operably coupled with said output means for comparing the outputs and determining whether the magnitude of one of the outputs exceeds that of the other; and left and right signal means operably coupled with said control means and responsive to the determination by the control means that the magnitude of one of the outputs exceeds that of the other output for indicating such condition to the operator of the baler to permit corrective steering of the baler and restoration of charges in the bale chamber which are of uniform volume from side-to-side of the chamber, said control means including a computer means for reading the outputs from the load detection means, and a sensor for determining whether a charge has been loaded into the baling chamber before the next compression stroke of the plunger, said computer means being connected with said sensor and being operable to ignore the outputs from the load detection means if the sensor means does not detect that a charge has been loaded into the baling chamber during the retraction stroke of the plunger.

6. In a mobile baler as claimed in claim 5; and charge signaling means operably coupled with said computer means for indicating to the operator each successive charging of the baling chamber with crop materials.

7. In a mobile baler:

an elongated, fore-and-aft extending baling chamber having a floor provided with an opening across the width of the chamber for admitting successive charges of crop materials into the chamber from the bottom thereof;

means for picking up crop materials from the field as the baler is advanced across the latter and feeding successive charges of the materials up into the baling chamber through said opening to fill the chamber from side-to-side and top-to-bottom with each charge, said chamber having a restricted discharge opening at its rearmost end through which completed bales issue from the baler;

a plunger in said chamber generally adjacent the forward end thereof and spanning the chamber from side-to-side and top-to-bottom, said plunger having drive means associated therewith for reciprocating the plunger longitudinally of the chamber through compression and retraction strokes for packing newly introduced charges of materials rearwardly in the chamber against previously compacted materials and incrementally advancing the compacted materials toward and through the discharge opening;

load detection means associated with said plunger for detecting structural loading at laterally spaced locations of the plunger during compression strokes of the plunger;

output means operably coupled with said load detection means for producing a pair of electrical outputs corresponding to the detected loading of the plunger;

control means operably coupled with said output means for comparing the outputs and determining whether the magnitude of one of the outputs exceeds that of the other; and left and right signal means operably coupled with said control means and responsive to the determination by the control means that the magnitude of one of the outputs exceeds that of the other output for indicating such condition to the operator of the baler to permit corrective steering of the baler and restoration of charges in the bale chamber which are of uniform volume from side-to-side of the chamber, said left and right signal means comprising visually perceivable indicators, said visual indicator means including a set of several left indicating liquid crystal segments and a set of several right indicating liquid crystal segments, the number of said left or right segments activated at any one time corresponding to the magnitude of said loading differential and the extent and direction of corrective steering of the baler needed to return the loading to an even condition.

8. In a crop baler as claimed in claim 7, wherein said visual indicator means further includes a center liquid crystal segment disposed between said left and right segments, said center segment when activated indicating even loading of the baling chamber.

9. In a crop baler as claimed in claim 7, wherein said left segments are provided with means for displaying the same in the form of a leftwardly pointing arrow and said right segments are provided with means for displaying the same in the form of a rightwardly pointing arrow.

10. In a mobile baler:

an elongated, fore-and-aft extending baling chamber having a floor provided with an opening across the width of the chamber for admitting successive charges of crop materials into the chamber from the bottom thereof;

means for picking up crop materials from the field as the baler is advanced across the latter and feeding successive charges of the materials up into the baling chamber through said opening to fill the chamber from side-to-side and top-to-bottom with each charge, said chamber having a restricted discharge opening at its rearmost end through which completed bales issue from the baler;

a plunger in said chamber generally adjacent the forward end thereof and spanning the chamber from side-to-side and top-to-bottom, said plunger having drive means associated therewith for reciprocating the plunger longitudinally of the chamber through compression and retraction strokes for packing newly introduced charges of materials rearwardly in the chamber against previously compacted materials and incrementally advancing the compacted materials toward and through the discharge opening;

load detection means associated with said plunger for detecting structural loading at laterally spaced locations of the plunger during compression strokes of the plunger;

output means operably coupled with said load detection means for producing a pair of electrical outputs corresponding to the detected loading of the plunger;

control means operably coupled with said output means for comparing the outputs and determining whether the magnitude of one of the outputs exceeds that of the other; and left and right signal means operably coupled with said control means and responsive to the determination by the control means that the magnitude of one of the outputs exceeds that of the other output for indicating such condition to the operator of the baler to permit corrective steering of the baler and restoration of charges in the bale chamber which are of uniform volume from side-to-side of the chamber, said driving means for the plunger including a pair of laterally spaced structural members coupled with the plunger, said load detection means including a pair of relatively movable transducer components on each member operable upon relative movement caused by loading in the member to change an electrical parameter experienced by an electrical circuit means associated with said transducer components.

11. In a mobile baler as claimed in claim 10, wherein said structural members comprise push-pull arms for the plunger.

* * * * *